(12) United States Patent
Fierro

(10) Patent No.: US 6,369,327 B1
(45) Date of Patent: Apr. 9, 2002

(54) UNIVERSAL POSITIONING TOOL FOR AN ELECTRICAL BOX

(76) Inventor: Charles J. Fierro, 540 Lafayette Ave., Westwood, NJ (US) 07675

(*) Notice: Subject to any disclaimer, the term of this patent is extended or adjusted under 35 U.S.C. 154(b) by 0 days.

(21) Appl. No.: 09/680,072

(22) Filed: Oct. 6, 2000

(51) Int. Cl.[7] .................................................. H01H 9/02
(52) U.S. Cl. ......................... 174/58; 174/63; 220/3.3; 248/906
(58) Field of Search .......................... 174/53, 57, 58, 174/65 R, 60, 63, 64, 50, 3.4; 220/3.2, 3.7, 3.9, 3.92, 4.02, 3.3; 248/544, 906; 33/DIG. 10, 528; 269/904, 50

(56) References Cited

U.S. PATENT DOCUMENTS 2,990,172 A * 6/1961 Gianotta ...................... 269/50
4,850,115 A * 7/1989 Price et al. .................... 33/528
5,491,901 A * 2/1996 Parrino .............. 33/DIG. 10 X

FOREIGN PATENT DOCUMENTS

DE             004033963   *   4/1992   ................. 174/58

* cited by examiner

Primary Examiner—Dean A. Reichard
Assistant Examiner—Dhiru R. Patel
(74) Attorney, Agent, or Firm—Alfred E. Miller

(57) ABSTRACT

A portable positioning tool for consistent locations of either plastic or metal electrical utility boxes or upright studs. The tool locates the pre-established vertical height from the floor for the electrical box as well as the position of the front surface of the electrical box relative to the thickness of the finished wall. The tool is provided with a replaceable mounting block for either a plastic or metal electrical outlet box.

6 Claims, 4 Drawing Sheets

FIG.1
FIG.2
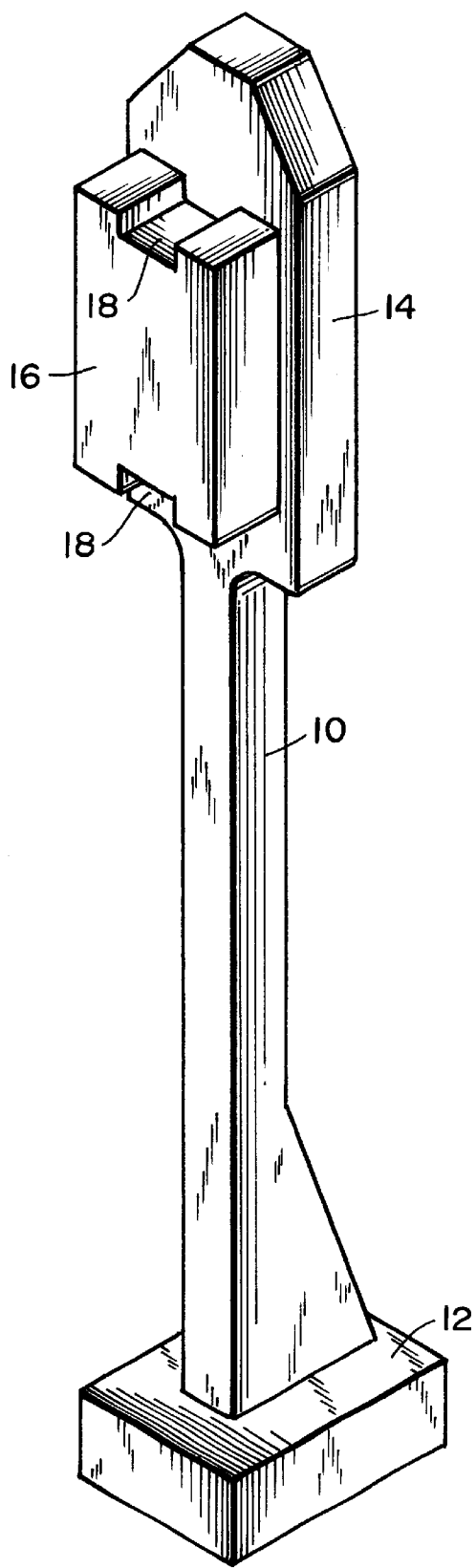
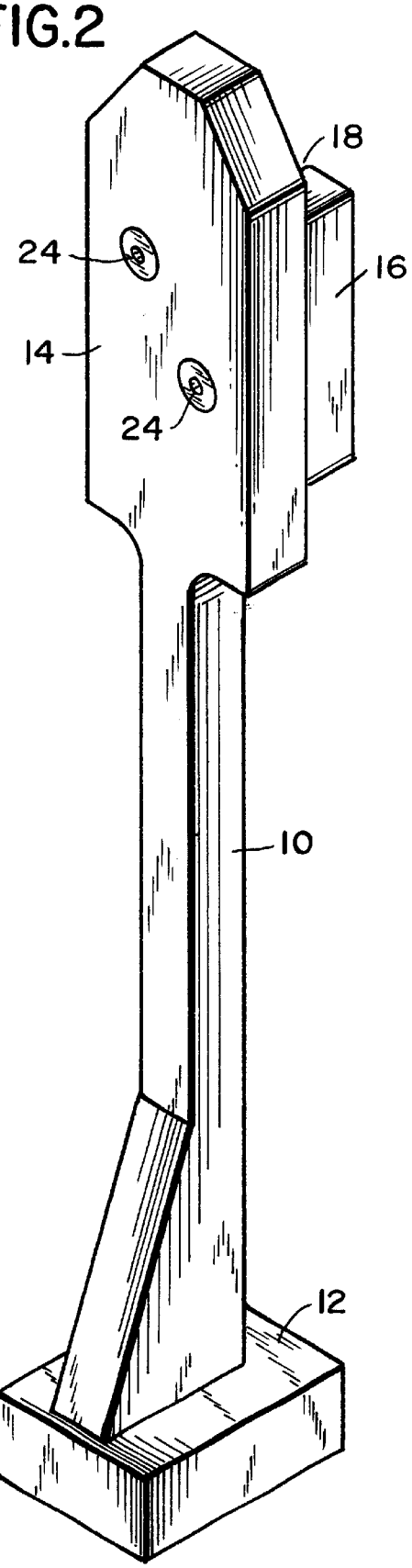

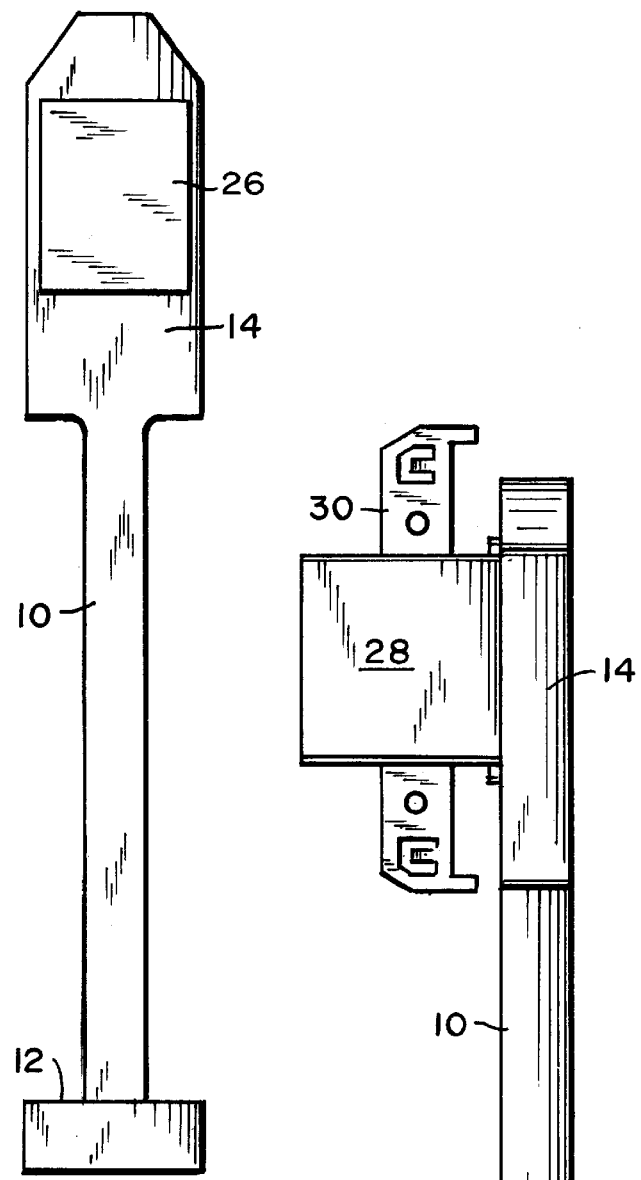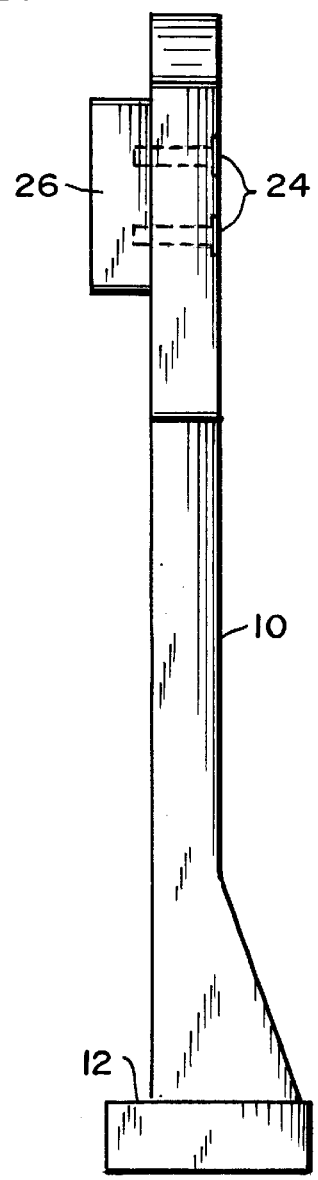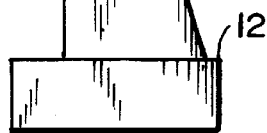

UNIVERSAL POSITIONING TOOL FOR AN ELECTRICAL BOX

The present invention relates to a new and improved positioning tool for both a plastic and metal electrical box to be mounted on wall studs in a building being constructed.

BACKGROUND OF THE INVENTION

It is known in building construction that the contractor is required by building codes to install electrical outlet boxes at multiple prescribed locations in each room in the building. It is therefore common practice to either nail or screw electrical outlet boxes for female wall plugs to the upright wall studs. Each of the outlet boxes are positioned and mounted at a uniform height on the respective wall stud and have its front surface projecting outwardly from the stud a distance which represents the outside thickness of the finished wall, which may be sheetrock or wall board.

In the initial rough building construction the location of the electrical outlet boxes to be mounted on the studs are measured vertically from the floor, and as stated hereinbefore, the outlet boxes extend a predetermined distance from the forward face of the stud, which is the thickness of the finished wall materials that are attached to the studs. There are many devices for mounting electric utility boxes on studs such as U.S. Pat. No. 4,850,115 to Price et al., U.S. Pat. No. 5,072,523 to Dickson, U.S. Pat. No. 5,992,036 to Cornelli and U.S. Pat. No. 5,921,522 to Weber, but none of these patents show or suggest applicant's universal tool for accurately positioning and mounting outlet boxes of different configurations.

Metal outlet boxes have been in use for years, but in recent times plastic outlet boxes with diagonally positioned nails or screws are being used in increasing numbers. It is therefore desirable to have a positioning and mounting tool that can be utilized for positioning and installing either a plastic or a metal electrical box, thus creating a universal tool that has utility for the two types of outlet boxes.

SUMMARY OF THE INVENTION

Briefly stated, the invention comprises a tool for accurately and repetitive placement of rectangular electrical boxes, such as outlet or junction boxes on upright studs having at least two removable outlet box mounting blocks for either metal or plastic outlet boxes which are precisely configured for snug, friction fitting within the interior of the electrical outlet box.

Another object of the present invention is to provide a device or tool for reliably duplicating the positioning of electric utility boxes on upright studs in building construction.

It is a further object of the present invention to provide a durable tool of simplified construction for positioning and holding either a plastic or metal electric utility box while facilitating the mounting of the box on a stud.

Other objects and features of the present invention will become apparent from the following description of the preferred embodiment considered in connection with the accompanying drawings. It is understood, however, that the drawings are designed solely for the purposes of illustration and not as a definition of the limits of the invention, for which reference should be made to the appended claims.

BRIEF DESCRFIPTION OF THE DRAWINGS

FIG. 1 is a perspective view of the front of the positioning tool or device having a removable mounting block for a plastic electric utility box constructed in accordance with the teachings of my invention.

FIG. 2 is a perspective view of the back of the tool shown in FIG. 1.

FIG. 6 is a front elevational view of the electric utility box-mounting block for a metal electric utility box.

FIG. 7 is a side elevation view of the tool shown in FIG. 6 showing the removable replacement block and FIG. 8 is a side elevational view similar to that shown in FIG. 7 but showing a standard metal electric utility box affixed to the replacement-mounting block.

DESCRIPTION OF THE PREFFERED EMBODIMENT

Figures 3, 4:
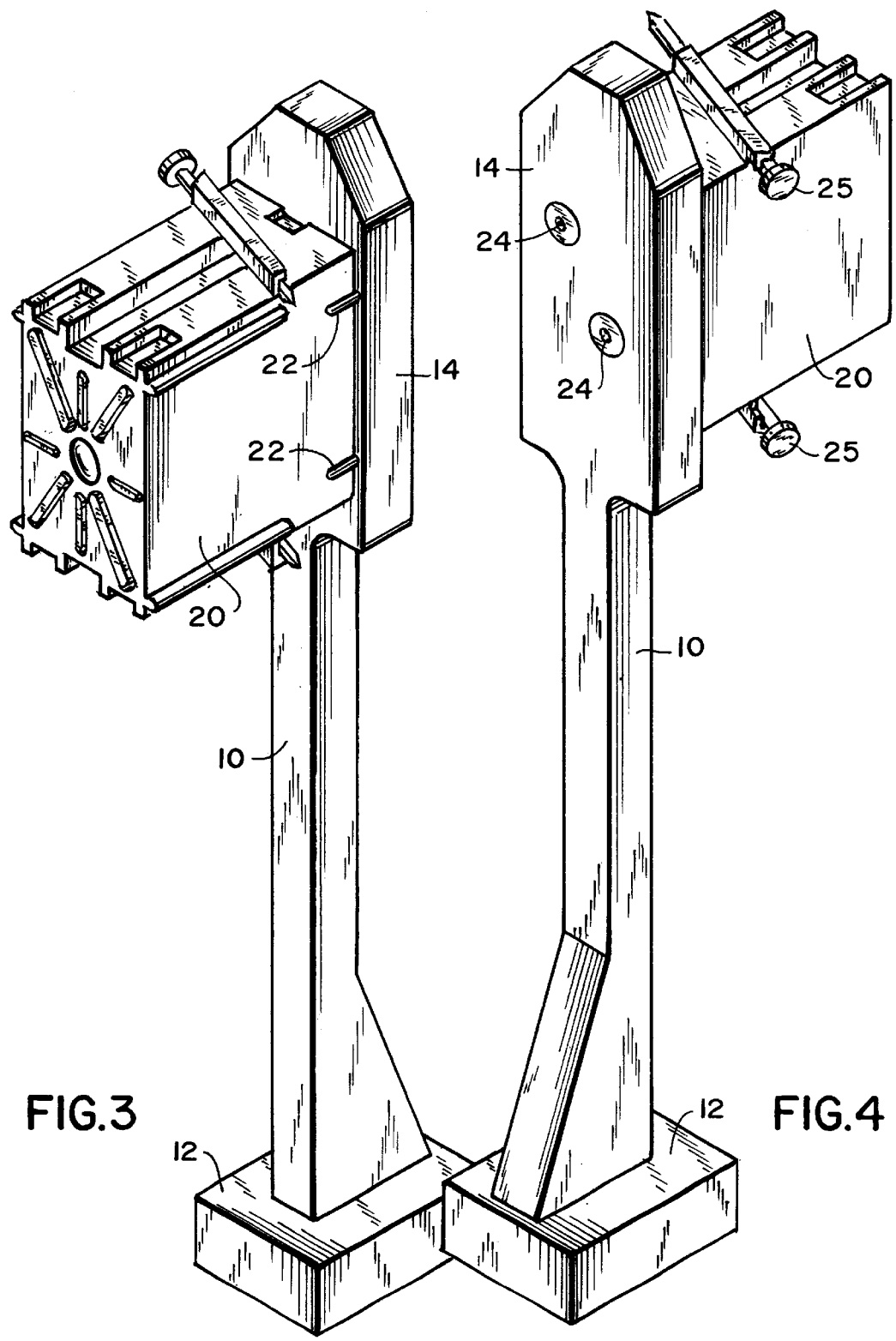
FIG. 3 is a perspective of the front of the tool as shown in FIG. 1 with a plastic electrical utility box affixed to the removable mounting block.
FIG. 4 is a perspective of the back of the tool as seen in FIG. 2 with the plastic electrical utility box affixed to the mounting block.

Referring particularly to FIGS. 1–5, a tool or device in the form of an upright post 10 is shown having a base 12 and an enlarged post head 14. Removably attached to the enlarged post head is a generally rectangular center-mounting block 16 having a reduced center section due to cutouts or channels 18 to accommodate complementary internal structures such as elongated mounting posts 19 on the plastic electrical outlet box 20. Consequently, the mounting posts 19 are slid into and frictionally fit within the channel 18. As seen in FIG. 3, the plastic electrical utility box 20 is provided with raised projections 22 each of which have a length which is the distance the front of the electrical box will project from the surface of the stud facing into the room in order to accommodate the thickness of the finished wall surface. This thickness is shown as B in FIG. 5.

Figure 5:
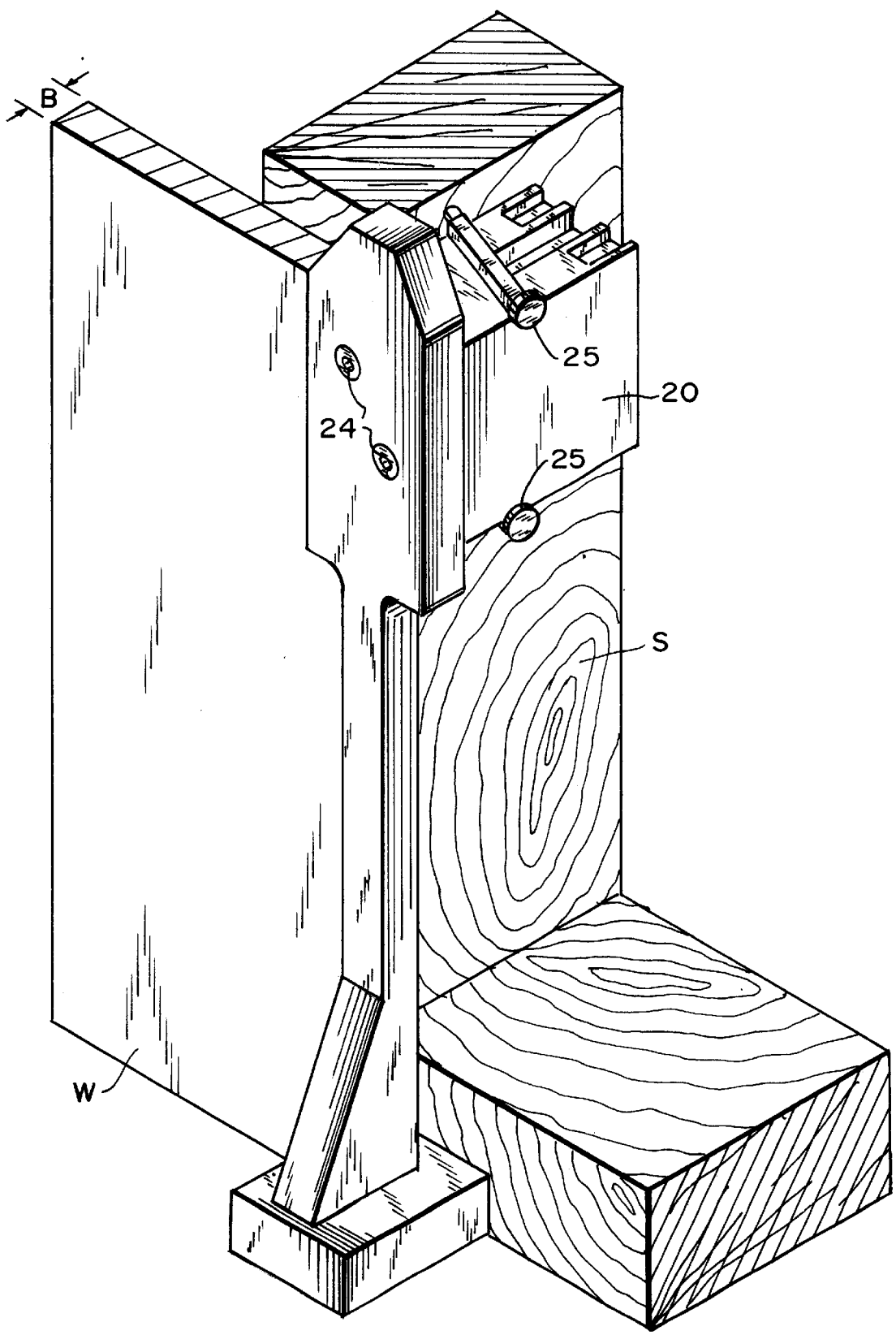
FIG. 5 is a perspective view showing the tool illustrated in FIG. 1 being correctly positioned on an upright stud by means of diagonally positioned nails.

The sheetrock or wallboard W is seen abutting the upright stud S to form the finished wall surface. As seen in FIGS. 5 and 6, the plastic electrical box 20 is mounted on the stud by means of diagonally directed nails 25. Screws 24 as seen in FIGS. 2, 4 and 5 permit the plastic outlet box conforming mounting block 26 which is generally rectangular in configuration to be removable. The mounting block conforms to the interior of a metal electrical utility box 28 so that the box is frictionally held on the mounting block 26 for positioning and mounting the electrical box on an upright stud. The metal electrical utility box 28 is provided with an upright attached plate 30 for placing against the side of the stud so that the outlet box projects forward of the face of the stud establishing the distance the box opening projects forward of the stud to accommodate the thickness of the wall covering.

Screws 24, as seen in FIG. 7, permit the metal electrical box to be mounted on the head 14 of the upright post 10, and the metal box can be replaced with the plastic box 20 by changing the mounting blocks, thus permitting the user to have a tool that is universally usable, and which is compact, robust and portable, and extremely efficient for the intended purpose.

While there has been shown and described an embodiment of the present invention, it will be understood that various changes in the form and details of the device illustrated and its operation may be made by those skilled in the art without departing from the spirit of the invention. It is the intention; therefore, to be limited only as indicated b the scope of the claims appended hereto.

What is claimed is:

1. A tool for positioning and mounting an open-ended plastic electrical utility box provided with face plate mounting posts to a vertically arranged wall stud comprising an elongated upright member having a base adapted to rest on a floor surface, a rectangular-shaped mounting block having a top and bottom cut-out to accommodate said face plate mounting posts, means removably mounting said mounting block adjacent to the top of said upright member and said mounting block being configured to frictionally fit within said open-ended electrical utility box.

2. A tool as claimed in claim 1 wherein said mounting block is configured for a plastic electrical utility box.

3. A tool as claimed in claim 2 wherein said plastic electrical utility box has projections on the outside of the box for depth setting of the box relative to the finished wall structure.

4. A tool as claimed in claim 1 wherein said mounting block is removed and replaced with a mounting block configured for a metal electrical utility box.

5. A tool as claimed in claim 3 wherein said second mounting block for said metal electrical utility box is rectangular.

6. A tool as claimed in claim 1 further comprising depth setting means on at least one side of said box for establishing the predetermined distance the front of electrical utility box projects beyond said stud.

* * * * *